Dec. 14, 1943.     F. A. WEDBERG ET AL     2,336,823
RETRACTABLE LANDING GEAR
Filed Jan. 31, 1941     2 Sheets-Sheet 1

INVENTORS
FRANK A. WEDBERG AND
BY FRANK LAKOWITZ
ATTORNEY

Dec. 14, 1943. F. A. WEDBERG ET AL 2,336,823
RETRACTABLE LANDING GEAR
Filed Jan. 31, 1941 2 Sheets-Sheet 2
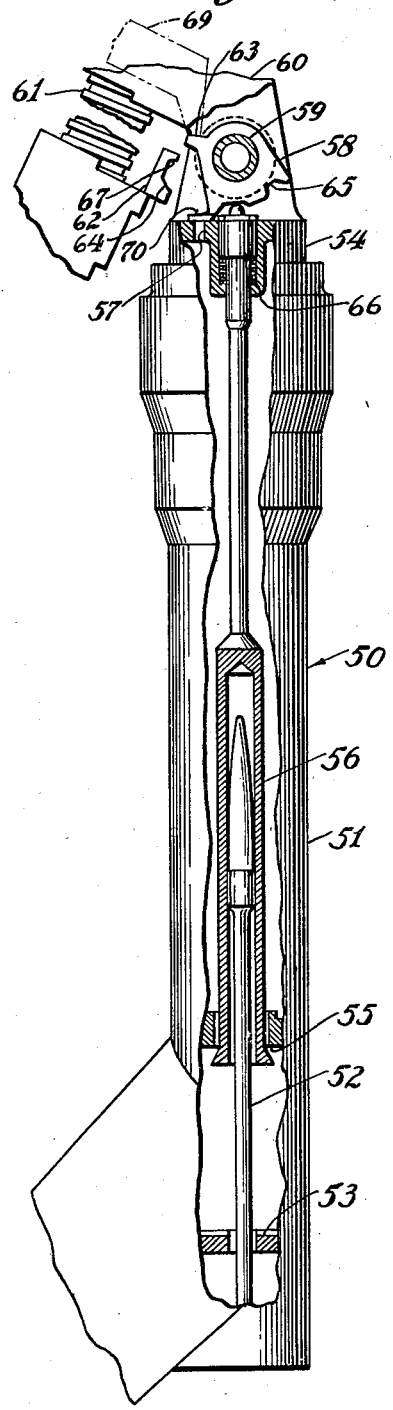
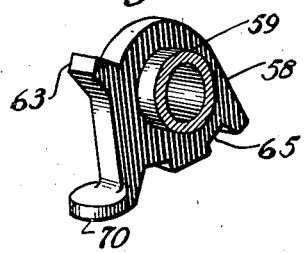
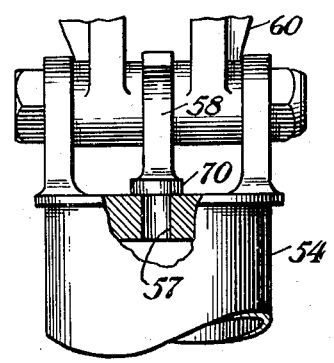
INVENTOR
FRANK A. WEDBERG AND
BY FRANK LAKOWITZ
ATTORNEY

Patented Dec. 14, 1943

2,336,823

UNITED STATES PATENT OFFICE

2,336,823

RETRACTABLE LANDING GEAR

Frank A. Wedberg, Kenmore, and Frank Lakowitz, Tonawanda, N. Y., assignors to Curtiss-Wright Corporation, a corporation of Delaware Application January 31, 1941, Serial No. 376,752

11 Claims. (Cl. 244—102)

This invention relates to improvements in retractable landing gears and is particularly concerned with valve mechanism adapted for use in the shock absorbing struts of such gears.

The invention comprises in general improvements in the form of landing gears shown in Patent No. 2,014,793 in the names of Weymouth and Wedberg, and in Patent No. 2,073,362 in the names of Butler, Palmer and Payne. Said patents disclose landing gear systems in which a telescoping shock absorber strut has the no load and one load lengths and in addition, a collapsed length shorter than either of the other two to which short length the shock absorbing strut is collapsed when the landing gear is retracted within a portion of the aircraft body. Thereby, the landing gear may be folded within the body to occupy a substantially smaller space than would otherwise be possible.

It is preferred to use an oleo pneumatic shock absorber strut in landing gears of this kind and the full collapse of the strut is made easier by opening a valve to allow of the escape of that air which serves as a cushioning medium in the device. It has been found that if the shock absorber strut remains vented when the landing gear is fully retracted, some of the oil or other fluid in the strut may be lost through the strut vent during flight, particularly when the aircraft is subjected to acrobatics as in the case of pursuit and fighting airplanes.

It is thus an object of this invention to provide a vent closing valve for a shock absorber strut in a retractable landing gear and to provide automatic means for closing the vent when the landing gear is completely retracted.

A further object of the invention is to provide a vent and closure in a pneumatic telescoping strut, the system being so arranged that the vent is open at all times except when the strut is fully collapsed.

A further object of the invention is to provide vent closing means cooperating with the retracting and extending mechanism of a retractable landing gear.

Further objects of the invention will become apparent in reading the detailed description below in connection with the drawings, in which:

Fig. 5 is a front elevation, partly in section, showing an alternative arrangement of strut;

Fig. 6 is a perspective view of the valve component of the alternate strut; and

Fig. 7 is a side elevation of the top of the alternate strut.

Figure 1:
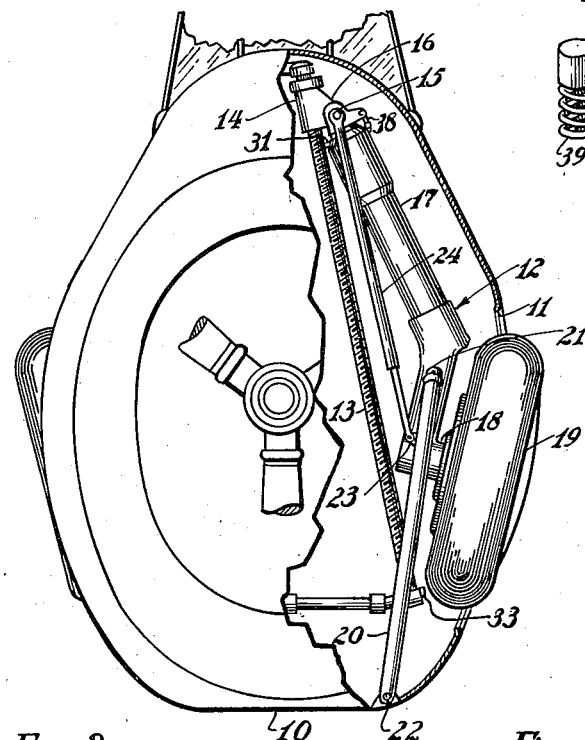
Fig. 1 is a front elevation of an aircraft body partly broken away to show the landing gear system.
Figure 4:
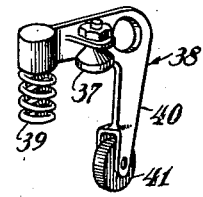
Fig. 4 is a perspective view of the vent closing valve of the strut.
Figure 2:
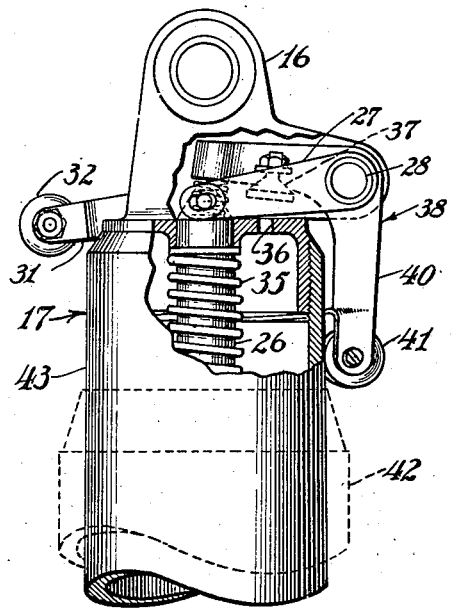
Fig. 2 is a fragmentary front elevation of the top of a shock absorber strut.
Figure 3:
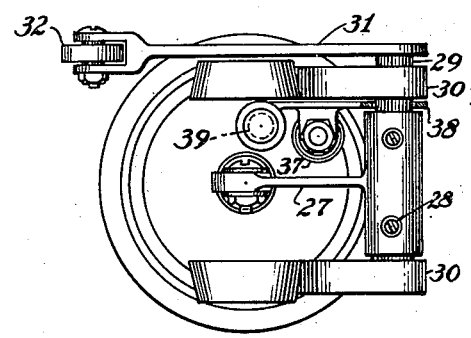
Fig. 3 is a plan of the top of the shock absorber strut.

First referring to Figs. 1 to 4, we show an aircraft body or fuselage 10 provided with lateral openings 11 through which a landing gear designated generally as 12 may be extended and retracted. Within the body a screw shaft 13 is carried, there being suitable mechanism, not shown, for rotating this shaft. A nut 14 on the shaft carries a pivot 15 to which the top trunnion 16 of a shock absorber strut 17 is secured. Said strut carries, at its lower end, a wheel axle 18 and a wheel 19. The lower end of the strut 17 carries a brace strut 20 pivoted at 21 thereto, the other end of the strut 20 being pivoted to the fuselage at 22. Intermediate the end pivots 21 and 22 is a pivot 23 to which a strut 24 is pivoted, the top end of the strut 24 being pivoted to the trunnion 15. The strut 24 is a telescoping device having an established maximum length but being capable of shortening through a lost motion connection. The arrangement thus far described is similar to that mentioned in one of said previous patents and its operation is briefly as follows:

When the screw shaft 13 is rotated to extend the landing gear, the nut 14 is run downwardly and the landing gear 12 is extended laterally and downwardly. As said extension takes place, the strut 24 permits the strut 17 to extend so that the length of the strut 17, with the landing gear extended, will be greater than its length when retracted. Obviously, retraction of the landing gear by reversing the direction of rotation of the screw shaft 13 will collapse the strut 17 as the landing gear 12 is nested in the body.

The strut 17 is provided with an internal valve similar generally to that shown in Fig. 5 which is closed when the landing gear is extended to trap air within the strut to serve as an air spring. The stem of this valve is indicated at 26 in Fig. 2, this stem projecting through the top of the strut and having a clevis connection with an arm 27 secured at 28 to a shaft 29 carried in brackets 30. Another lever 31 is secured to the shaft 29 and is provided with an end roller 32 engageable with an abutment 33 at the bottom of the screw shaft to enforce closure of the internal strut valve when the landing gear is fully extended. Upon initiation of landing gear retraction, the roller 32 leaves the abutment 33 and a spring 35 within the strut forces the internal strut valve open to permit air trapped within the strut to exhaust therefrom through a vent 36 in the top wall of the strut.

Means are provided in the form of a valve 37 to close the vent 36 as the landing gear reaches its fully retracted position, this valve 37 being carried on a bellcrank 38 freely pivoted on the shaft 29. The upper horizontal arm of the bellcrank, which carries the valve 37, also carries a spring 39 bearing on the top of the strut which tends to urge the valve 37 away from the vent 36. The vertical arm 40 of the bellcrank 38 carries a roller 41 normally bearing on the side of the strut. When the strut collapses, the cylinder 42 thereof telescopes upwardly over the upper plunger portion 43 and as complete telescoping takes place, upon landing gear retraction, the top of the cylinder 42 engages the roller 41 and swings the bellcrank 38 counterclockwise about its pivot 29, forcing the valve 37 downwardly over the vent 36 to close same. Thus, when the landing gear is fully retracted, the internal strut valve is open, but the strut vent 36 is closed to prevent the leakage or loss of liquid from the strut, which may have entered the upper plunger portion 43.

Fig. 5 shows a strut 50 adapted to be used in the same sort of landing gear as is shown in Fig. 1, this strut comprising a lower cylinder member 51 carrying a metering pin 52 which passes through a partition 53 at the bottom of a strut plunger 54. The plunger is also provided with a valve seat partition 55 while a valve 56 carried by the plunger and axially movable with respect thereto, may engage or disengage the valve seat 55 to close the bottom of the plunger or to open same to the atmosphere through a vent 57 in the top of the strut plunger. Operation of the valve 56 is afforded by a cam 58 rotatable upon an upper strut trunnion 59 by which the landing gear strut is secured to the nut 60, axially movable along the screw shaft 61. The bottom bearing for the screw shaft carries a dog 62 engageable with a spur 63 on the cam 58 so that, when the landing gear is extended, the spur engages an abutment 64 on the dog to rotate the cam 58 so that a clearance portion 65 thereof is placed in alinement with the valve stem 56, permitting the valve to close on the seat 55 under the influence of a valve closing spring 66. When the landing gear is retracted, the spur 63 engages an abutment 67, turning the cam 58 almost to the position shown in Fig. 5 whereat the valve is held open. Now, when the nut 60 is run to the top of the screw 61, a dog 69 is provided thereat which is engaged by the spur 63 to turn the cam 58 an additional increment in a counterclockwise direction whereupon a vent closing tab 70 carried by the cam 58 is forcibly pushed down over the strut vent 57 to prevent leakage therefrom. As soon as the landing gear is extended, the spur 63 leaves the abutment 69 and the tab 70 is free to uncover the vent 57 through the camming action of the valve stem 56 on the cam surface of the element 58, permitting of the inspiration of air through the vent as the strut extends whereby air under atmospheric pressure passes into the strut and serves as an air spring between the valve seat 55 and the partition 53 after the landing gear is fully extended and after closure of the valve 56 against its seat 55, which closure is, as above indicated, effected by rotation of the cam 58 by engagement of its spur 63 with the dog 62.

Although the above description outlines the operation of the landing gear and strut valve operating means in general, the invention is particularly concerned with the strut vent and the closure therefor, which operates when the landing gear is fully retracted. Other elements of the system, such as the internal strut valve and its operating means form more particularly the subject matter of one of the said two prior patents. However, the vent closing device, though particularly appropriate to struts of the character disclosed, may have considerable utility in environments other than those shown.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a retractable landing gear including a telescoping shock absorbing strut and means to collapse said strut during landing gear retraction and to extend the strut during landing gear extension, a vent duct in the strut to allow egress and entrance of air during strut collapse and extension, and means to close said vent duct responsive to movement of the landing gear to a retracted position.

2. In a retractable landing gear including a telescoping shock absorbing strut and means to collapse the strut upon landing gear retraction, a vent in the strut to allow issue of trapped air therefrom during strut collapsing, a closure for the vent, and means to move the closure into operative position in response to final collapsing movement of the strut.

3. In a retractable landing gear including a telescoping shock absorbing strut and means to collapse the strut upon landing gear retraction, a vent in the strut to allow issue of trapped air therefrom during strut collapsing, a closure for the vent, means to hold the closure from vent closing in all positions of the landing gear except substantially full retraction, and means to move the closure to vent closing position in response to movement of the landing gear in the region of substantially full retraction thereof.

4. In a retractable landing gear including a shock strut comprising an upper plunger vented at its upper end and a lower cylinder slidable over said plunger, means to slide the cylinder upwardly over the plunger upon landing gear retraction whereby air exhausts through said vent, and means responsive to landing gear movement to close the vent when the gear is retracted.

5. In a retractable landing gear including a shock absorbing strut comprising an upper plunger vented at its upper end and a lower cylinder slidable over said plunger, means to slide the cylinder upwardly over the plunger upon landing gear retraction whereby air exhausts through said vent, a bellcrank pivoted to the upper end of the plunger having arms extending across the top of the plunger and along a side thereof, a vent closure carried by the first arm, and means carried by the second arm engageable by the cylinder end as said cylinder telescopes over the plunger to rock the bellcrank and move the vent closure into vent closing position.

6. In a retractable landing gear including a shock absorbing strut comprising a top-vented plunger hinged to the aircraft and a cylinder slidable over the plunger during landing gear extension and retraction, a closure movable to cover and uncover said vent, and means to move the closure to a vent covering position actuated by final retractive movement of the landing gear.

7. In a retractable landing gear shock absorber strut, a plunger having a vented top chamber and a lower fluid chamber, a cooperating member slidable over the plunger, a valve operable to open and close said plunger chambers relative to one another, and a closure movable to cover the vent when said valve is open and when the cooperating member is telescoped over said plunger.

8. In a retractable landing gear, a strut comprising members in telescoping relation, one of said members being vented and one of said members having a valve therein, a valve operator responsive in its action to landing gear retraction and extension, and a vent closure carried by said valve operator, the latter being movable to cause the vent closure to close said vent at the limit of landing gear retraction.

9. In aircraft, a retractable landing gear including a telescoping strut adapted to contain air, a valve on said strut for allowing communication between the interior of said strut and the outside air, and means responsive to movement of said landing gear to a retracted position for closing said valve.

10. In aircraft, a retractable landing gear including a telescoping strut adapted to contain air, a valve on said strut for allowing communication between the interior of said strut and the outside air, and means responsive in its operation to movement of the landing gear to and from an extreme retracted position for respectively closing and opening said valve.

11. In aircraft, a retractable landing gear, a pneumatic shock absorber strut including a plunger slidable in a cylinder, means for sealing the interior of said strut against the escape of contained air when said landing gear is in its fully extended attitude and operative upon initiation of landing gear retraction to vent the strut, and means for sealing the strut from the atmosphere when the landing gear is in its fully retracted attitude and operative upon initiation of landing gear extension to unseal the strut interior for communication with the atmosphere.

FRANK A. WEDBERG.
FRANK LAKOWITZ.